United States Patent [19]
Billingsley et al.

[11] Patent Number: 5,800,579
[45] Date of Patent: Sep. 1, 1998

[54] PRESSURE BALANCED CYCLONE SEPARATOR

[75] Inventors: John G. S. Billingsley, Newark, Del.; Lawrence D. Bush, Nazareth, Pa.

[73] Assignee: Precision Cutters, Inc., Phillipsburgh, N.J.

[21] Appl. No.: 763,757

[22] Filed: Dec. 11, 1996

[51] Int. Cl.$^6$ .................................................. B01D 45/12
[52] U.S. Cl. .......................... 55/337; 55/417; 95/19; 96/400
[58] Field of Search ........................... 55/210, 212, 213, 55/270, 274, 320, 332, 337, 417, 414; 95/22, 268, 19

[56] References Cited

U.S. PATENT DOCUMENTS

| | | | |
|---|---|---|---|
| 3,257,151 | 6/1966 | Sprackling | 55/417 |
| 4,473,326 | 9/1984 | Oetiker | 55/210 |
| 4,975,100 | 12/1990 | Ginelli | 55/210 |
| 5,236,479 | 8/1993 | Billingsley | 55/337 |

FOREIGN PATENT DOCUMENTS

| | | | |
|---|---|---|---|
| 782836 | 11/1980 | U.S.S.R. | 55/213 |
| 2 055 633 | 3/1981 | United Kingdom | 55/213 |

*Primary Examiner*—C. Scott Bushey
*Attorney, Agent, or Firm*—Connolly & Hutz

[57] ABSTRACT

Pressure control apparatus for a cyclone separator includes a variable air flow control valve in at least one line exiting from the separator. The air flow through that valve is adjusted in response to pressure changes in the separator. A flow control valve with adjustable bladders is preferred.

6 Claims, 2 Drawing Sheets

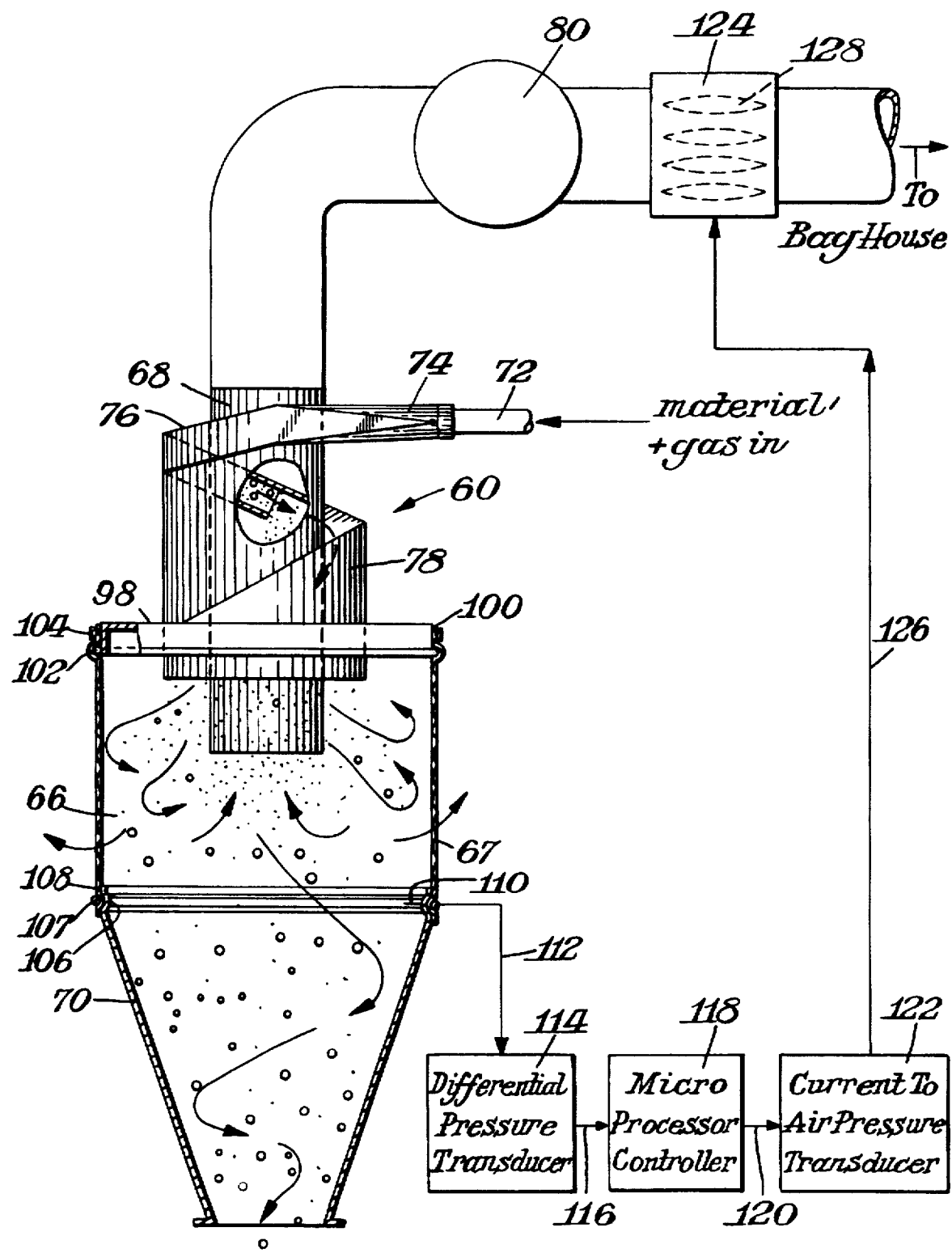

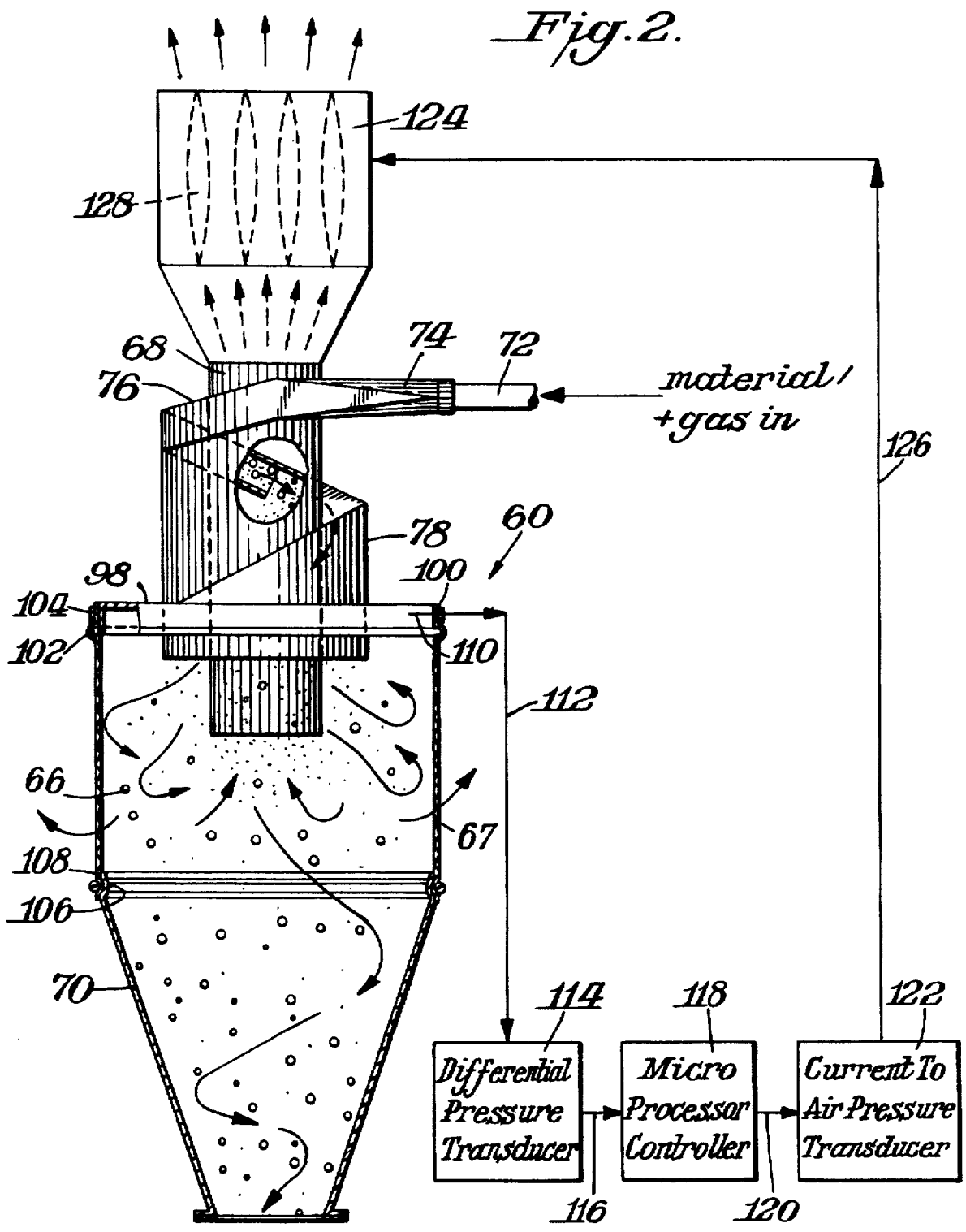

PRESSURE BALANCED CYCLONE SEPARATOR

BACKGROUND OF THE INVENTION

The use of cyclone separators to sort materials conveyed in a gas stream is well known. An improvement on such separators is disclosed and claimed in Billingsley et al U.S. Pat. No. 5,236,479. This patent describes a cyclone separator which includes a separating chamber connected at its upper end to a gas discharge chamber and connected at its lower end to a particle discharge chamber. A feed tube spirally wraps at least partially around the upper discharge and directs a stream of gas containing a mixture of light and heavy particles into the separating chamber in a high velocity, downward, radial direction.

The wall of the separating chamber is made from a porous material which is scrubbed by the downward, radial passage of the particles across that material. Gas passes through the porous wall of the separating chamber thereby dramatically reducing the volume of air leaving through the upper and lower discharge chambers connected to the separating chamber. Reduced flow of gas through the upper discharge chamber is particularly desired in order to minimize the amount of particulate matter exiting through that opening, the object being to maximize particulate separation from the gas and removal through the lower discharge chamber or opening. Similarly, reduction in exit gas flow and velocity through the lower particle discharge chamber is desirable to minimize the amount of light particle dispersion (dust) that might be created by a fast moving stream of gas impinging upon light particles in a collecting chamber or hopper below the opening of the lower discharge chamber.

In the device disclosed in Billingsley et al U.S. Pat. No. 5,236,479 the only means for adjusting outflow of air and material as between upper and lower discharge chambers are: (1) alteration of the entering gas volume or (2) adjusting the diameter of the principal separating chamber to increase the surface area (and exiting gas flow) through the porous wall of that chamber.

Such adjustment is complicated by the observed tendency of the porous material in the middle chamber to slowly lose its gas transmissibility due to partial plugging of that material with fine particulate material. Such plugging forces more gas out of the upper and lower discharge chambers which will result in discharged material being blown or conveyed over a wide area, which is normally unacceptable in most operating plants.

SUMMARY OF THE INVENTION

As noted in Billingsley U.S. Pat. No. 5,236,479 the plugging of the porous material in the sidewall of the disclosed cyclone separator is minimized by the scouring effect of the particles on the inside of the porous material. This effect is imparted by the toroidal feed tube that imparts a high speed downward, spiral velocity to the gas and particles entering the separator. The inside surface of the porous material is constantly scrubbed by the rapidly rotating, downwardly directed heavy particles. This prevents, or minimizes, the buildup of dust or particles on the inside surface of the porous material.

Extensive experience in operation of the cyclone separator disclosed in the Billingsley patent, however, has led to the conclusion that further improvements are needed to assure continuous, long term uniform operation. More particularly, operation of that cyclone separator on some types of particulate material has shown a tendency to partially interrupt the flow of gas out of the porous material thereby deleteriously increasing flow of gas out of the upper or lower discharges. Increased flow of the lower discharge has the disadvantage of blowing the discharge material over a wide area and generally dusting the area. This is the converse of the objective of the separator, i.e., to separate and contain the particles in a readily disposable form. Increased flow out of the upper discharge can similarly blow very light materials out of that discharge contributing to the aforementioned dusting problem.

To offset this problem, the inventors have developed a closed loop automatic pressure control system that maintains a constant operating pressure within the cyclone separator. Constant pressure in the separator ensures that the volume of air leaving the upper and lower discharges is maintained at the desired rate to avoid unwanted dispersion of particulate matter beyond the collection areas associated with the cyclone separator.

This objective is achieved by carefully controlling the internal pressure of the cyclone separator. Applicants achieve this control by inserting an infinitely adjustable flow control valve in the exit from the upper discharge.

In applicants' improved cyclone separator a pressure sensor within the cyclone separator reads pressure variations therein and transmits an electrical signal proportioned to the pressure variations from a set point. The electrical signal is fed to a micro processor controller which regulates the adjustable flow control valve in the upper discharge. Adjustment of the valve in response to the processor signal maintains a desired pressure within the separator.

DESCRIPTION OF THE DRAWINGS

FIG. 1 is an elevational view partly in section of a controlled pressure cyclone separator in accordance with this invention;

FIG. 2 is an elevational view partly in section of another embodiment of a controlled pressure cyclone separator in accordance with this invention.

DETAILED DESCRIPTION

FIGS. 1-2 illustrate the details of separator 60 in accordance with this invention. In general, separator 60 is a cyclone separator which operates under the principle of centrifugal force wherein the bulk of light and heavy particles entering the separator 60 are separated from the entering gas and are discharged into a receptacle (not shown) adjacent the bottom of a conical lower discharge 70. Any minute dust particles carried by gas exiting the top of the separator may be collected in a collector or bag house as indicated in FIG. 1.

Separator 60 includes a main cylindrical separating chamber 66 which will be discussed in greater detail. An upper gas discharge chamber 68 extends into and communicates with the interior of separating chamber 66. The lower portion of chamber 68 disposed within chamber 66 may be a perforated cylinder. The lower particle discharge chamber 70 is connected to and communicates with the interior of separating chamber 66.

A mixture of gas (usually air) and a range of very light dust to heavy particles is conveyed into a feed tube 72 of generally circular cross-section. As shown in FIGS. 1-2, feed tube 72 is connected to a transition section 74 wherein the cross-section of the feed tube changes from a circular cross-section to a rectangular cross-section at feed chute 76. Feed chute 76 spirally wraps around chamber 68 and communicates with an annular sleeve 78 spaced from and substantially surrounding gas discharge chamber 68. The spiral wrap of feed chute 76 extends about 180° around chamber 68 thereby imparting a downward, spiral velocity to the mixture of gas, and light to heavy particles entering separating chamber 66 as illustrated in FIGS. 1–2.

The provision of a porous media cylinder wall 67 for chamber 66 permits much of the gas within chamber 66 to pass through wall 67. This substantially reduces the volume and velocity of gas leaving separator 60 through the upper 68 and lower 70 discharge chamber openings.

Most of the particles, as well as some dust and gas, leave the separator 60 through the lower discharge 70. The balance of entering gas and some unavoidable portion of minute dust particles left in the separator are discharged from the upper discharge 68 into the area of influence of the fan chamber 80 which conveys the dust and gas into a filter bag separator or bag house as illustrated in FIG. 1.

As further illustrated in FIG. 1, an imperforate top wall or plate 98 covers separating chamber 66. Wall 98 has a central opening through which sleeve 78 and upper discharge chamber 68 penetrate whereby the sleeve 78 and discharge chamber 68 extend into the interior of separator chamber 66.

Advantageously the porous media cylindrical wall 67 of separator chamber 66 is detachably mounted should it be necessary to replace or change the porous media 67. Any suitable means of detachable mounting may be used. In the illustrated embodiment top wall 98 includes a peripheral downwardly extending flange 100 with a peripheral lip 102. The upper edge of porous media 67 is disposed over lip 102 against peripheral wall 100 and detachably mounted in place by, for example, a tightening band 104 of any suitable construction. Similarly, the lower end of the porous media 67 of separating chamber 66 may be detachably mounted to the lower discharge 70. In the illustrated embodiment the funnel shaped discharge chamber 70 includes an upwardly extending rigid cylindrical wall 106 having a channel 108. The porous material of separating chamber 66 is disposed over the cylindrical portion 106 of discharge chamber 70 and detachably mounted in place by a tightening band 107 located at channel 108 with the porous material therebetween.

Complete details of the construction and operation of the cyclone separator 60 are contained in Billingsley U.S. Pat. No. 5,236,479, the disclosure of which is incorporated herein by reference.

As noted in that patent (Column 2, lines 10–14), the configuration of feed chute 76 imparts a downward, spiral velocity to material and gas entering the separator 60. This tends to drive heavier particles toward the lower discharge 70 as well as scrub the interior surface of porous media 67. This scrubbing action helps to keep the pores in media 67 open, thereby providing a relatively constant flow of gas out of the separator through media 67. Blockage of media 67 would adversely affect the operation of separating chamber 66 by unduly increasing the amount and velocity of gas passing through the upper and lower discharge chambers 68 and 70. These higher velocities adversely affect the separation of the gas from the conveyed particles as previously explained.

Experience with operation of the separator 60, as disclosed in the Billingley et al '479 patent has uncovered an occasional problem with partial blockage of the porous media 67 with resultant, unwanted increase in the amount and velocity of gas and particles exiting from the upper 68 and lower 70 discharges. This problem has occurred with certain forms of particulate matter that are small enough to become enmeshed in media 67 and/or are too small to effectively scrub the interior of the media 67. In those situations the velocity exiting the lower discharge 70 is unacceptably high causing a wide, uncontained dissemination of particulate matter in the workplace surrounding the cyclone separator 60.

To offset this problem a closed loop automatic pressure control system has been added by applicants to the separator described in the Billingsley et al '479 patent. This system maintains a relatively constant pressure within the separator 60. Constant pressure insures that the volume of air leaving by the lower discharge 70 will be constant and the above-mentioned problems associated with excess air flow will be avoided, or at least ameliorated.

Constant pressure within separator 60 is maintained by a unique combination of a pressure sensor and a highly responsive control valve associated with the upper discharge 68. More particularly, a pressure sensor probe 110 is inserted into the upper (FIG. 2) or lower (FIG. 1) portion of separating chamber 66 and connected by tubing 112 to a differential pressure transducer 114 which converts sensed pressure into electrical signals. The probe location and distance of penetration into separation chamber 66 can be varied with minimal effect on operation. Instead of a probe 110, a simple opening in the flanges 106 or 100 can be used to connect the tubing 112 to the chamber 66. For best operation the probe 110 or corresponding opening should not be in direct line of the incoming air and material. A location in a relatively quiescent zone where material buildup is minimal is a preferred location for the probe or opening 110.

The differential pressure transducer 114 measures differential pressures and transmits an output signal 116 proportional to the measured pressure changes. The output signal 116 is transmitted as an analog 4–20 milliamp format for further processing. A transducer 114 found suitable for use in this invention is the ST 300 Smart Transmitter Differential Pressure Model STD120 sold by Honeywell.

The output signal 116 from the pressure transducer 114 is directly proportional to the pressure within separating chamber 66. That signal is transmitted to a microprocessor controller 118 which compares the pressure output signal 116 to a preset value and, in turn, transmits an electorial signal 120 based on that difference. A controller 118 suitable for use in this application is a UDC Mini-Pro Digital Controller by Honeywell.

The signal 120 from the controller 118 is fed to a current to air pressure transducer 122. The transducer 122 is an electropneumatic device that reduces a higher supply pressure to a variable lower pressure directly proportional to the output signal 120 from the controller 118. A current to air pressure transducer suitable for use in the invention is a Bellofram type 1000 I/P transducer.

The regulated air pressure exiting transducer 122 is channelled via pipe 126 to a variable air flow control valve 124 associated with the exit piping from the upper discharge 68. A preferred air flow control valve 124 is that marketed by Connor Air Distribution Systems under the name Pneumavalve. An important characteristic of the Connor valve is its infinitely variable bladders 128 which are expanded and contracted by the variable air pressure fed from transducer 122 through pipe 126. The transducer 122 generally sends air pressure between 0–15 psi to the Pneumavalve in proportion to the output signals 120 from the controller 118. The varying air pressure is used to inflate and deflate the bladders in the Pneumavalve which, respectively, restrict and open the air flow path through the Pneumavalve. The Pneumavalve is unique in that it has linear operational flow control characteristics, i.e., the flow resistance across the valve is linearly proportional to the pressure transmitted through pipe 126 as regulated by transducer 122.

In operation, probe 110 detects a pressure inside the separation chamber 66 and conveys it by tubing 112 to pressure transducer 114 which generates an output signal 116 that is proportional to that pressure. That output signal 116 from transducer 114 is compared to the set point in controller 118 which generates the appropriate signal 120 to transducer 122 to raise or lower air pressure in the line 126 connected to the variable air flow control valve 124. That pressure variation is then transmitted to the inflatable bladders 128 of the valve 124 to restrict or increase air flow out of upper discharge 68. For example, if the porous media 67 starts to clog with particulate material or dust, the pressure in separation chamber 66 will start to rise because the available exits for air flow out of the chamber have been reduced in size or porosity. This increased pressure will cause the deleterious increase in air flow velocity out of upper 68 and lower 70 discharges noted above.

To prevent or reduce that increased velocity, this invention utilizes the pressure control system described above. More specifically, if an increase in pressure from partial blockage of media 67 is sensed in probe 110, that increase is sensed in transducer 114 which sends a signal to controller 118 which in turn sends a signal to transducer 122 that pressure in line 126 should be reduced. The reduced pressure in line 126 causes the flexible bladders 128 in valve 124 to deflate, thereby increasing air flow out of upper discharge 68. This increased air flow reduces the pressure in chamber 66 with a resulting reduction in the air flow out of lower discharge 70 with a consequential lowering of the velocity of particulate matter out of discharge 70. That in turn prevents the uncontrolled scattering of particulate matter and dust noted above.

Material and air leaving the separator 60 by the lower discharge 70 is directly associated with the pressure inside the separator 60. Maintenance of that pressure at a constant level win ensure stable lower discharge conditions, the objective of the system.

The embodiment of this invention shown in FIG. 1 is particularly adapted for use with very light films or dirty material sought to be separated in the cyclone separator 60. In this embodiment the lightweight dust or film particles are encouraged to exit discharge 68 by use of a fan 80 above the discharge. The exit of the fan 80 is connected to the air control valve 124 and ultimately to a bag house (not shown) or other collection device in order to keep the dust from the surroundings. FIG. 2 illustrates an embodiment where fine particles and dust are less of a problem and most of the separated material, due to size or weight, exits the lower discharge 70.

In the FIG. 1 embodiment control of exit velocity from discharge 70 of separator 60 is a function of fan 80 and air control valve 124. In this embodiment when control valve 124 deflates in response to increased pressure in separation chamber 66, the fan 80 will have less resistance at its discharge end and thus pump a greater volume of gas out of discharge 68. That increased volume through discharge 68 should offset the gas volume lost due to plugging of media 67, thereby maintaining the desired gas and particle exit velocity through discharge 70.

In both embodiments the objective is to maintain the pressure within separator 60 at a constant set value to effectively stabilize the discharge conditions at lower discharge 70.

We claim:

1. Pressure control apparatus for a cyclone separation device comprising a central separation chamber with porous side walls, a lower discharge opening open to the atmosphere, an upper discharge opening, a pressure sensor located in the central separation chamber, a controller for ascertaining pressure differences between a set point and the pressure in the central separation chamber, and a variable air flow control valve associated with the upper discharge opening which increases air flow therethrough in response to increased pressure in the central separation chamber sensed by the controller.

2. The pressure control apparatus of claim 1 wherein the variable air flow control valve includes flexible bladders that increase and decrease in dimension to regulate air flow therethrough.

3. The pressure control apparatus of claim 2 wherein the flexible bladders are increased or decreased in dimension by increasing or decreasing air pressure therein.

4. The pressure control apparatus of claim 3 wherein the air pressure in the flexible bladders is increased or decreased in response to outputs from the controller.

5. The pressure control apparatus of claim 2 wherein the output of the controller is connected to an air pressure transducer which controls the increase and decrease in dimension of the flexible bladders.

6. The pressure control apparatus of claim 5 wherein the air pressure transducer adjusts air pressure used to increase and decrease the dimension of the bladders.

* * * * *

UNITED STATES PATENT AND TRADEMARK OFFICE
CERTIFICATE OF CORRECTION

PATENT NO : 5,800,579
DATED : September 1, 1998
INVENTOR(S) : John G. S. Billingsley et al.

It is certified that error appears in the above-identified patent and that said Letters Patent are hereby corrected as shown below:

Column 5, line 41, replace "win" with --will--.

Signed and Sealed this

First Day of December, 1998

Attest:

BRUCE LEHMAN

Attesting Officer

Commissioner of Patents and Trademarks